FIG. I

INVENTOR.
CHARLES L. DU VIVIER
BY
Edward W. Eames
ATTORNEY

March 15, 1966     C. L. DU VIVIER     3,241,108
TRAFFIC ACTUATED CONTROL SYSTEM
Filed Sept. 12, 1960     8 Sheets-Sheet 3

INVENTOR.
CHARLES L. DU VIVIER
BY
ATTORNEY

March 15, 1966  C. L. DU VIVIER  3,241,108
TRAFFIC ACTUATED CONTROL SYSTEM
Filed Sept. 12, 1960  8 Sheets-Sheet 4

FIG.5

LTU = LANE TIMER UNIT

INVENTOR.
CHARLES L. DU VIVIER
BY
Edward H. Ennis
ATTORNEY

March 15, 1966 C. L. DU VIVIER 3,241,108
TRAFFIC ACTUATED CONTROL SYSTEM
Filed Sept. 12, 1960 8 Sheets-Sheet 5

INVENTOR.
CHARLES L. DU VIVIER
BY
Edward F. Cairns
ATTORNEY

INVENTOR.
CHARLES L. DU VIVIER

March 15, 1966 C. L. DU VIVIER 3,241,108
TRAFFIC ACTUATED CONTROL SYSTEM
Filed Sept. 12, 1960 8 Sheets-Sheet 8

FIG. 12

INVENTOR.
CHARLES L. DU VIVIER
BY
ATTORNEY

United States Patent Office 3,241,108
Patented Mar. 15, 1966

3,241,108
TRAFFIC ACTUATED CONTROL SYSTEM
Charles L. Du Vivier, Darien, Conn., assignor, by mesne assignments, to Laboratory for Electronics, Inc., Boston, Mass., a corporation of Delaware
Filed Sept. 12, 1960, Ser. No. 55,338
10 Claims. (Cl. 340—37)

This invention relates to a traffic control system for use at the intersection or junction of two streets or roadways, one or both of which have two or more lanes of traffic.

It has for its general object to provide an automatic control or signal system by means of which traffic in the several directions will be expeditiously and safely handled. The system is primarily controlled by the flow of vehicular traffic in the two intersecting or otherwise conflicting directions. The system is thus of the traffic actuated type. The control is obtained, not merely through sensing or measuring of traffic flow or traffic demand in one particular direction or traffic phase, but through sensing or measuring of traffic flow or traffic demand individually in each lane in that direction, or traffic phase, or in each of several of the lanes on a traffic phase. The term "traffic phase" refers to one or more traffic flows treated as a unit or group in accord of right-of-way by the traffic signals. Thus, two opposing approaches of a two-way street may comprise a traffic phase, or multiple lanes on a single approach to an intersection or on a one-way street approach to an intersection may comprise a traffic phase, and an ordinary street intersection may have two traffic phases, for example.

Prior devices for this purpose had controllers which operated during the green or "go" interval by dividing the green light interval into an initial portion and an extendible portion. The initial portion is preferably long enough to enable all vehicles which have been waiting during the red or "stop" period for that particular traffic phase to enter the intersection. The extendible portion permits the relative demands of traffic on the phase having the green to be compared with the demands of the phase having the red. As additional vehicles approach the green traffic light in the green phase, they actuate a traffic detector which serves to extend the length of the green period of the cycle.

Normally, the extent to which the green period is extended by each successive traffic actuation has been determined, (1) by the traffic volume or the number of traffic actuations per unit time, sometimes referred to as "density," on the phase having the green signal, (2) by the number of cars waiting to pass in the intersecting direction, and (3) the maximum waiting time having been experienced by any one car. Once the controller has determined, based upon these factors, that the light should change from green to red in the particular phase, then there may be an additional delay as a result of timing of a period measured from each actuation and known as the passage time. This delay is for the purpose of allowing the last vehicle which has passed the detector, but not reached the green light, to enter the intersection. It is conventional to provide a yellow or amber clearance period between green and red. Also it is conventional to provide an overall maximum time limit for the green period or extendible green period to prevent indefinite extension of closely spaced traffic.

Prior art control systems which disclose circuits and methods of accomplishing some of these functions are set forth in the following patents: United States Letters Patent No. 2,183,780 (or Reissue 21,377) to Harry A. Wilcox and United States Letters Patent No. 2,265,991 to John L. Barker. The disclosure of these patents is useful background for the present disclosure.

In existing and prior art devices and systems, problems have arisen in those situations where more than one lane has detectors which feed impulses to the control unit to actuate the system. In past practice, several detectors, one for each of several lanes going in either the same or opposed directions, on the same traffic phase, all have fed the same control unit so that the input pulses received by the system are variably additive in effects, and the control unit does not distinguish between the lane or lanes from which they came. Thus, depending upon whether specific pulses from two adjacent lanes for example, are in or out of phase in time position, there will be a different effect produced on the control system. If the two impulse signals arrive simultaneously, they will appear in the control circuits as merely one pulse, and actuate the circuits as though only one pulse had been received. If the two pulses are out of phase, they will then create a vehicle gap indicating volume density which appears to be high because the time interval between receipt of the pulses indicates that two vehicles are close upon one another. Actually, these vehicles would not be close because they would be in different lanes.

In addition, the fact that prior devices group and totalize incoming signals from parallel or directly opposed lanes on the same traffic phase, meant that there was no separate adjustment for each lane. Consequently, if, for example, one lane was uphill and its opposing lane downhill, no adjustment could be made for that.

One of the objects of this invention is to provide for variations in the number of lane-timer units to suit the traffic conditions at a given intersection. These units are preferably identical and interchangeable.

Another object of this invention is to provide an improved traffic control system or controller having individually detected lanes and associated timer units in which the impulses from the detector of one lane are fed into their own time unit. This gives a truer picture of the traffic pattern and avoids the effect of in-phase or out-of-phase multiple actuations from different lanes. Through use of multiple timers, adjustments to the individual detection units can be used to compensate for different road conditions, such as hills existing in specific different lanes.

Another object of this invention is to provide a control system in which in multiple lane two-way or one-way streets the traffic in the heaviest traffic lane will control the actuation of the traffic light, subject to the above-mentioned ability to individually bias or adjust each timer unit.

Another object of the invention is to utilize more accurate vehicle gap timing means on the green phase to be controlled by waiting time and/or number of cars waiting in the opposite, i.e. red phase and/or with control of such gap timing by traffic density on the green phase, so that a more accurate vehicle gap may serve to control the timing of change of phase of the system.

Another object is to provide an improved traffic actuated control system in which a passage time individual to each of multiple lanes on the same traffic phase is timed from each actuation of a traffic detector in said individual lane, whereby a time from detector to intersection may be individually provided and individually adjusted for different lanes on the same phase to accommodate different conditions.

A further object is to provide a passage time individual to individual traffic lanes on the same traffic phase, and a permissible gap time individual to individual lanes on the same traffic phase in which the permissible gap time is progressively reduced below, or from above to below, the passage time by traffic on the opposite traffic phase.

An additional object is to provide a passage time and reducing permissible gap time on a per lane basis on the traffic phase having the green signal as above, and in which if control of the green signal period is yielded for a reversal of right-of-way, when the gap time is less than the passage time, then the remainder of the last passage time to time out for the last vehicle continues the green signal.

Thus there are four timing effects in the present apparatus that serve to determine when the green and red phases are changed. These factors are the density of traffic flow in the green phase, the number of cars waiting on the red phase, and the longest waiting time in the red phase, and an overriding maximum period. In addition, the passage time serves to control the termination of green under some conditions. If desired, only one or more, or all, of these timing features can be used in a given circuit arrangement.

In the preferred embodiment of this invention, separate detectors are located in each traffic lane to be controlled by the traffic signal controller and are located about 100 to 300 feet back of the intersection. Each separate lane detector has an individual timing circuit unit associated with it, having individually biased adjustments. Each individual lane timing unit may have multiple tie-ins in it. Thus, the output from each lane detector timing unit is not affected by the traffic within other lanes of that phase. All problems of gap and random pulsations from detectors of more than one lane creating phase difficulties for sensing, measurement or control purposes are eliminated.

Each lane of traffic, then, determines for itself, while in the green phase, how much longer, in accordance with predetermined standards, it needs to remain in the green phase, subject under some conditions as more fully explained below, to modification by the lanes of traffic on opposing red phase. This information is transmitted to the main signal controller, and control is automatically effected by the maximum lane of the various lanes in that traffic phase. The factors entering into this determination by each individual unit are the gap, the traffic density or volume, the waiting period of the first car in the other red phase, the number of other cars waiting on such other red phase, the total elapsed time, and after the control signal has been given to shift from green to red, the number of vehicles and their position between the detector and the intersection in the green phase.

Each individual lane timer unit provides for the comparison of the actual gap between vehicles in that lane with the amount of permitted gap for that phase, as progressively reduced with the waiting time of the first car and/or number of waiting cars in the other phase.

Each individual lane timer unit allows for an initial minimum portion of green time, referred to above, and which is substantially proportional to the number of cars which passed the detector in that lane during the preceding red period for that lane, and thereafter the green timer extends (in the extendible portion) in accordance with further cars actuating the detector in that particular lane. The several timers of the particular lane timer unit are reset together by each traffic actuation in this extendible portion of the green period until the actual time gap between successive vehicle actuations exceeds the permissible gap based on the above control factors, whereupon the control signal is given for that lane to change or "yield," i.e. that the lane needs no more green time. However, the right of way signals will not change until all lane timer units for lanes in that or the opposing direction on the same phase have likewise given a control signal that they need no more green time. After a given unit has so indicated, it is locked.

Turning to the drawings.

Figure 1:
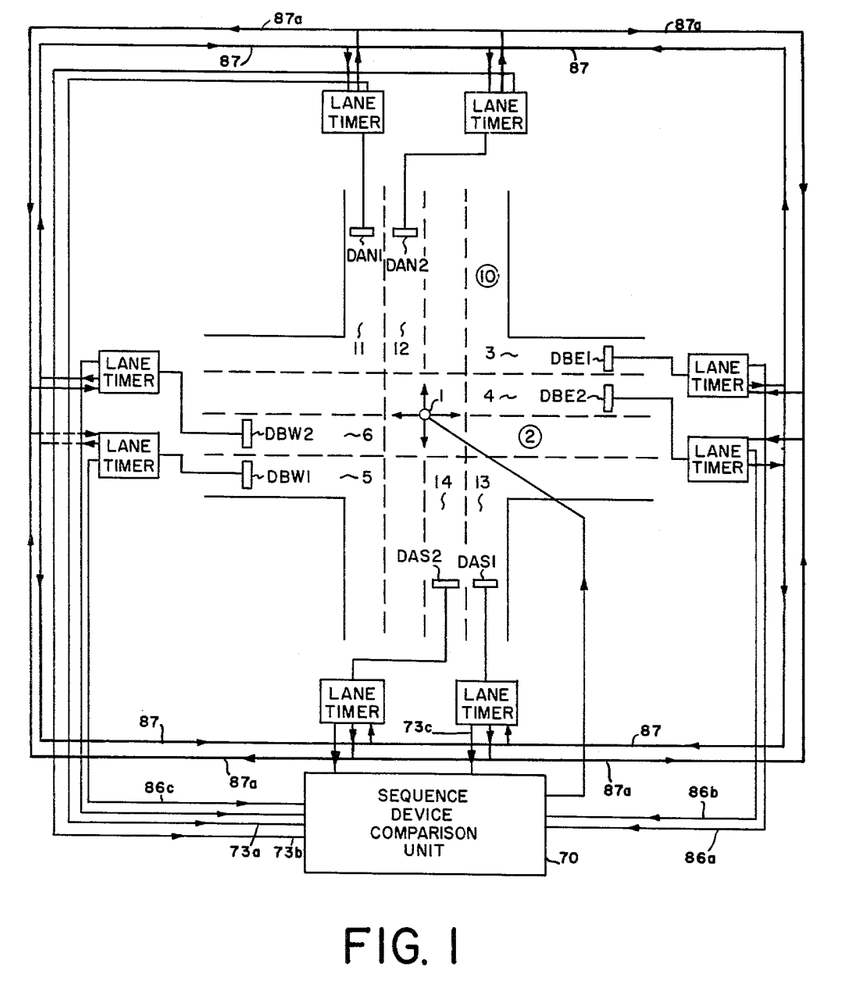
FIG. 1 shows a block diagram of the system in association with an intersection of streets or roadways.

In FIG. 1 there is shown a traffic intersection in which a street running east and west (horizontally on the paper) intersects with a street running north and south (vertically). Each street is here shown as having four lanes, two in each direction. A traffic light 1 is located in the middle of the intersection. The east-west street 2 has lanes 3 and 4 traveling to the west and lanes 5 and 6 to the east. The north-south street 10 has lanes 11 and 12 traveling south, and 13 and 14 traveling north.

For convenience, the streets running north and south will be designated as phase A, and the streets running east and west as phase B.

Phase A in the southbound direction, i.e. lanes 11 and 12, has detectors DAN1 in lane 11 and DAN2 in lane 12. These detectors are positioned so that the automobile will actuate them prior to reaching the interseciton.

Likewise, northbound lanes 13 and 14 of phase A have respective detectors DAS1 and DAS2. The east-west streets correspondingly have detectors DBE1 and DBE2 in lanes 3 and 4, respectively, and DBW1 and DBW2 in lanes 5 and 6, respectively. The detectors used here may be of any conventional type.

Associated with each lane detector is a lane timer unit that acts as a lane computer. These lane timer units have, in the preferred form of this invention, circuits for the timing functions previously mentioned. They receive information from their respective detectors and from all detectors in the other phase. The output signal from each of these units is fed into the sequence device comparison unit. This unit compares the output of all the timer units from the phase that is green at the time of the output signal from the lane units in a given phase during the green period, the controlling signal is the one which calls for the longest continued extension of the extendible portion of the green period. The sequence device comparison unit serves at a given time the phase which is then green. If we assume that phase A is green, it will serve phase A until it turns red. At that time the sequence device comparison unit will serve phase B.

Figure 2:
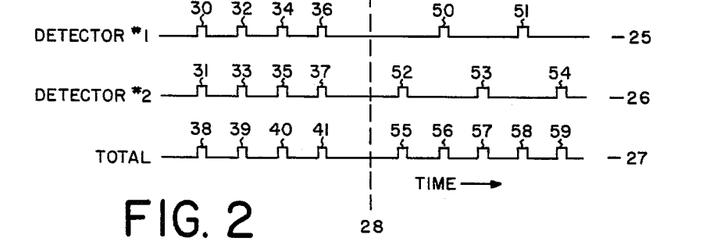
FIG. 2 shows graphically the curves of pulses received by two corresponding lanes in the same or opposing directions on the same street or traffic phase, showing the time-phase relationships that can occur between the pulses.

FIG. 2 shows the problem which arises in that form of multi-lane detector system in which the impulses received from the detectors in different lanes on the same traffic phase are added together before they are analyzed by the timer units. By way of example, this figure shows the use of two detectors. Plotted here on a time scale are the pulses received. Those from detector #1 are shown on the line marked 25; from detector #2, on the line marked 26; and the total of impulses from both detectors, on the third line marked 27. On the portion of the graph to the left of dotted line 28 is shown a situation where the pulses from each of the two detectors are in phase. Thus, pulse 30 from detector #1 is in phase with pulse 31 from detector #2; and 32 is in phase with 33; 34 is in phase with 35, and 36 is in phase with 37. Consequently, the total number of impulses received through this totalizing technique is just the same as that of one of the individual detectors alone. The total here shows pulses 38, 39, 40 and 41. Thus, in this part of the example it is seen that the timer unit will only take in account half as many vehicles as are actually traveling in the lanes in question.

On the other hand, the portion of FIG. 2 shown to the right of dotted line 28 shows the opposite problem. There the impulses received by detector #1 and marked as 50 and 51 are out of phase with the impulses received by detector #2, 52, 53 and 54. Consequently, the total number of impulses indicated is five, marked 55, 56, 57, 58 and 59. Though this total is correct, the gap, i.e. the spacing between the impulses indicates a far higher traffic density than actually exists on each lane.

Figure 3:
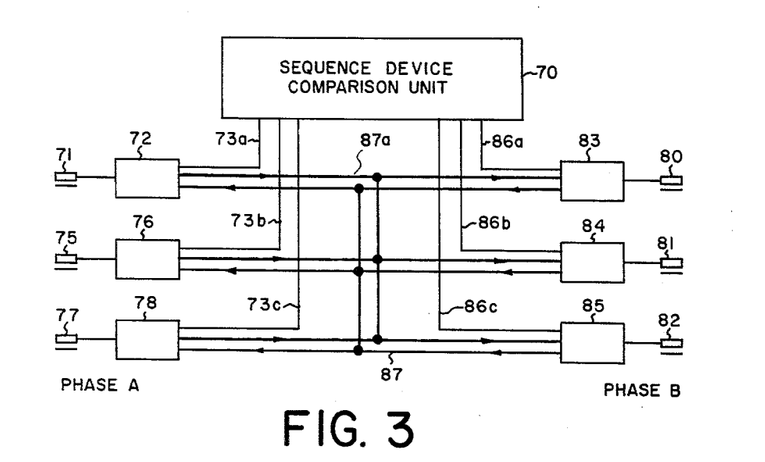
FIG. 3 is a block diagram showing the relationship of the individual lane detecting and timing units in the two traffic phases to one another and to the sequence device comparison unit.

FIG. 3 shows in block form the interconnection of the lane timer units for each phase. In the block diagram there are shown three detectors and corresponding lane timer units in phase A and the same number in phase B. Each of these is connected to the sequence device comparison unit 70. Detector 71 of phase A is connected to lane timer unit 72 and thus through line 73a to the comparison unit 70. Detector 75 operates through lane timer unit 76 and connects with line 73b leading to the comparison unit. Detector 77 and lane timer unit 78 connect through line 73c. Likewise, phase B has detectors 80, 81 and 82 individually connected to lane timer units 83, 84 and 85, respectively. These connected are through lines 86a, 86b and 86c, respectively, to the sequence device comparison unit. Lines 87 and 87a indicate feedback of information on waiting cars. Thus, it can be seen that the outputs of detectors for each individual lane pass through lane-timer means before being compared with one another. This avoids the problem set forth in the example shown in FIG. 2, all as will be further explained below.

Figure 4:
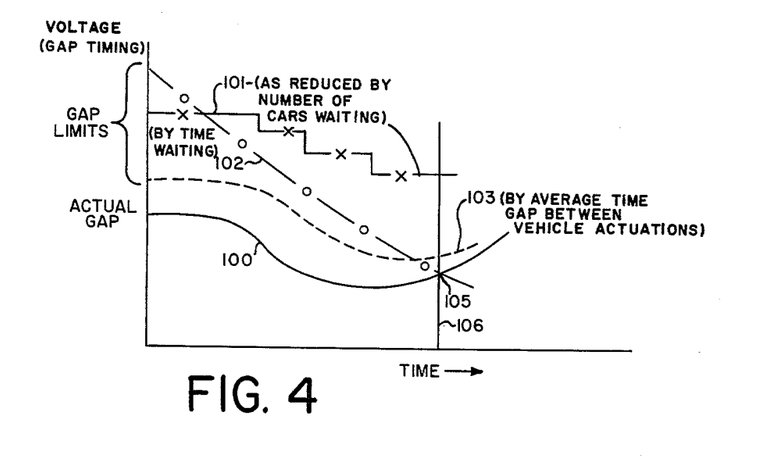
FIG. 4 is a graph showing various possible outputs of the timing circuits which are compared to produce a final cut-off or lock-out period for each lane timing unit in the series.

In FIG. 4, examples of the types of signal that each lane timer unit deals with are plotted on one graph. Signal potentials are represented on the vertical axis, and time on the horizontal axis. The lefthand vertical axis represents that point in time when the light for the phase in question has just turned green. Curve 100 represents the actual gap between vehicles as determined by the detector in the lane in question. As is often the case, the gap is greater when vehicles are first starting from a stopped position. As the vehicles move more quickly, the gap is reduced. After the major portion of the stopped vehicles have passed beyond the detector, then the gap begins to increase as shown as curve 100 moves towards the right. Plotted also on this same graph are curves representing permissible gap as reduced by the number of waiting vehicles in the other phase 101, the length of the first car's waiting time 102, and the permitted gap 103, as adjusted automatically at a predetermined percentage above the average gap between vehicle actuations.

Each of the curves 101, 102 and 103 is here plotted in terms of the maximum gap that is permitted before the green phase of the circuit shall cease for this lane. Thus, when the actual gap as shown by curve 100 passes through any one of the other three curves, the demand for further extension of green period ends as far as this particular lane timer unit is concerned (except for the passage time to be allowed, which will be discussed below). In the example of the graph of FIG. 4, curve 102, representing the waiting time of first car to have stopped in the other phase is the first of three curves to cross the curve representing the gap. This crosses at point 105. Vertical line 106 placed on the graph represents, then, the end of the control of the green time period for the lane in question, except for the permissible passage time.

Figure 5:
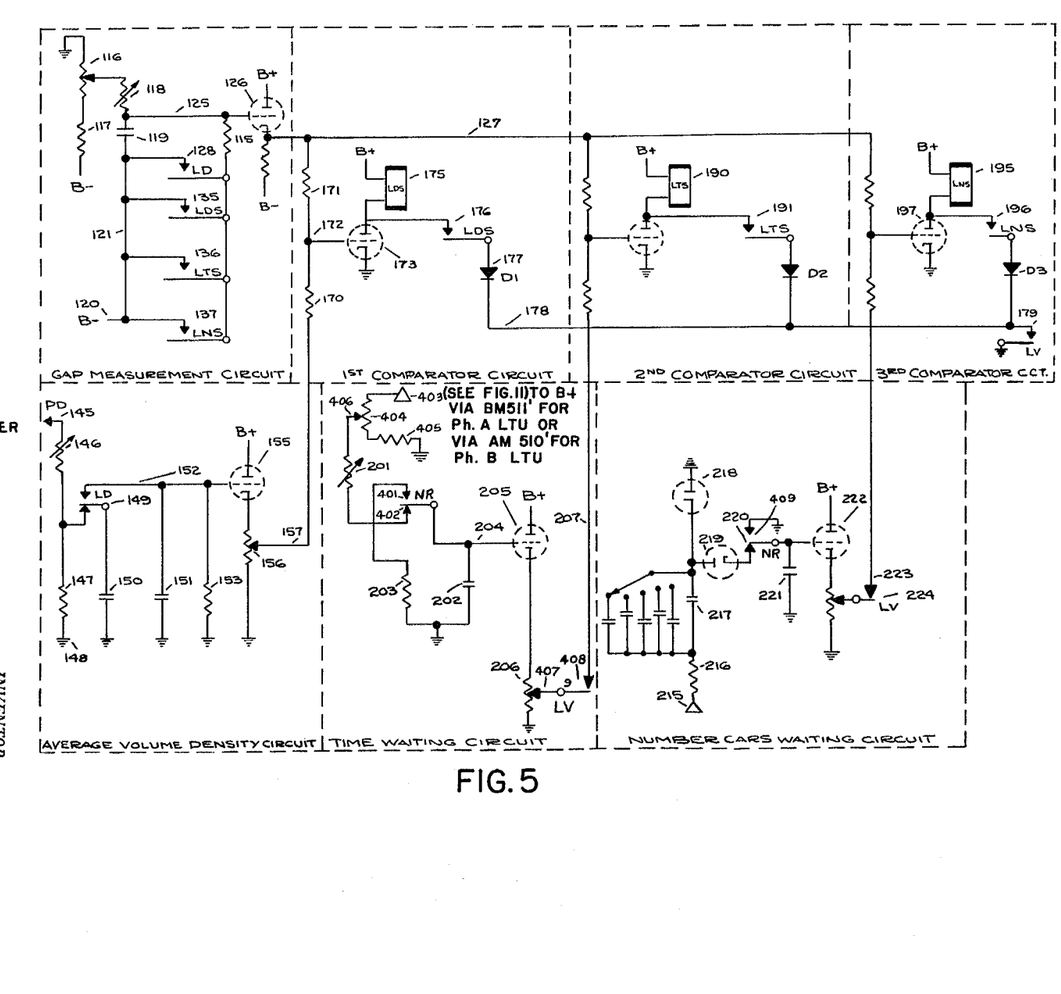
FIG. 5 is a schematic diagram showing the circuit of the gap timers for an individual lane timing unit.

FIG. 5 gives a circuit digram for the gap timer circuits of one of the lane timer units. For greater clarity this diagram has been divided into boxes identifying various portions of the circuit. The boxes are labeled as Gap Measurement Circuit, First Comparator, Second Comparator, Third Comparator, Average Volume Density Circuit, Time Waiting Circuit, and Number of Cars Waiting Circuit. The detector relay contact 128 for the lane of this particular unit is shown in the upper lefthand corner. A source of negative potential (B—) is connected through fixed resistance 117 and potentiometer resistance 116 to ground. Potentiometer resistance 116 is tapped and the indicated potential lead through an adjusting resistor 118, to adjust for desired gap, and timer condenser 119 by line 121 to a source of negative potential 120 (B—).

Gap adjustment resistance 118 and condenser 119 form an RC timing circuit which builds up a potential on condenser 119. This potential is applied through line 125 to the grid of triode 126, wired as a cathode follower. The potential across condenser 119 passes also through line 125 to resistor 115 and thence to normally open lane detector relay contact 128. Upon actuation of this contact, the condenser 119 is discharged, creating a sawtooth pattern for the input potential to the grid of tube 126. This waveform is repeated at the cathode of tube 126 by lead 127 to the first, second, and third comparator circuits, to be discussed below. The remaining normally open contacts 135, 136 and 137 in the gap measurement circuit serve, when closed, to short out the lane detector circuit. These will be considered below.

The average volume density circuit is made up of a source of potential 145, voltage dividers 146 and 147 in series leading to ground 148. Tapping the voltage dividers is a relay contact 149 actuated by the lane detector and leading through condenser 150 to ground. In its normal position, relay contact 149 connects the source of potential 145 with condenser 150 charging it fully. Upon actuation of the lane detector relay contact 149 is momentarily moved to its upper contact position so that condenser 150 is discharged into condenser 151 through line 152. Condenser 151 is connected through variable leak-resistor 153 to ground. Thus, the charge on condenser 151 will be built up as pulses come in from condenser 150 upon actuation of the lane detector and then slowly reduced. The potential on condenser 151 is reflected in the grid of tube 155 which is wired as a cathode follower circuit. The potential relative to ground at the grid of tube 155 then corresponds to that on the condenser 151. The voltage available at the cathode of tube 155 is then tapped through tap resistor 156 and the output voltage led into the first comparator circuit on line 157. This voltage on line 157 represents average volume density over a predetermined averaging time period.

The first comparator circuit is made up of series voltage dividing resistors 170 and 171 interconnecting at lead 172 which leads to the grid of triode 173. The voltage across series resistors 170 and 171 is the drop from the positive voltage on line 157 from the average volume density circuit to the negative voltage on line 127 from the gap measurement circuit. As the positive voltage on line 157 increases, the grid bias on tube 173, likewise, increases to a point where tube 173 finally conducts. This results in energization of LDS relay 175 which is in series between the plate potential of tube 173 and the plate itself.

The circuit parameters of the average volume density circuit are adjusted such that the potential on line 157 indicating the average volume density increases to a plateau that is balanced at a point below the most positive peak produced by the gap measurement circuit (led into the comparator circuit through lead 127). As the number of vehicles per unit time decreases, the average volume density potential, being a time average, falls off more slowly than does the potential created by the gap measurement circuit. Consequently, these two potentials approach each other and finally make tube 173 conducting. Variable tap 156 of the average volume density circuit can be adjusted for spacing of the traffic so that tube 173 does not become conducting until the normal traffic begins to fall off. This adjustment is calibrated as a percentage of the size of the gap measurement wave amplitude, i.e., as the percentage by which the actual gap must exceed the average gap, for such tube conduction.

When triode 173 becomes conducting as set forth above, this energizes relay LDS 175 and closes contact 76 and contact 135 (in the gap measurement circuit). Contact 176 leads through diode 177 and lead 178 to LV relay contact 179, described below, and ground. Thus once tube 173 has become conducting relay 175 will remain energized until the circuit is broken by the opening of contact 179.

Contact 135 of relay LDS 175 located in the gap measurement circuit is also closed upon energization of this relay. Once this is closed, condenser 119 and resistor 115 are connected together through lead 125 and contact 135, and the lane detector relay contact 128 is shorted out of the circuit.

The second and third comparator circuits operate in the same manner as the first comparator circuit and consequently need not be described in greater detail, except to state that the second comparator circuit compares the same voltage on line 127 with the output 207 of the time waiting circuit and the third comparator circuit compares voltage 127 with the output 223 of the number of cars waiting circuit. The second comparator circuit has relay LST 190 and relay contacts 191 and 136 associated with it. The third comparator circuit has relay LNS 195 and associated contacts 196 and 137.

It can be seen, therefore, that whenever any one of the three relays 175, 190 and 195 in any one of the three comparator circuits is actuated, the gap measurement circuit on lane detector contacts 128 becomes inoperative and the bias on line 125 entering tube 126 and leading to output comparator voltage line 127 will remain fixed as calibrated.

The time waiting circuit of FIG. 5 measures the length of time that the first car to arrive in the other phase has been waiting for a change of light.

During the time that green is accorded to the traffic in the other phase, relay NR of each of the lane timer units associated with a given phase will be energized. Moving contacts 401 will be closed, completing a circuit from capacitor 202 via line 204, contact 401 and resistor 203 to ground. This circuit discharges capacitor 202. When the green period of the opposite phase ends relay NR is deenergized and contacts 401 open and contacts 402 close. When the first car crosses a vehicle detector associated with the said other phase, this "call" registered by deenergizing of the memory relay associated with that phase (AM relay for phase A, BM relay for phase B). When this relay is deenergized, it applies B+ to terminal 403 of FIG. 5. Potentiometer 404 and resistor 405 form a potential divider across this voltage. Tap 406 on potentiometer 404 may be adjusted to give the proper voltage to calibrate timing resistor 201. A circuit is completed from a source of potential at tap 406 through resistor 201, contacts 402 to capacitor 202. This forms an RC timing circuit to charge capacitor 202 to time the first interval that the first car has waited. The voltage across capacitor 202 is applied via line 204 to the grid of triode 205, which is wired as a cathode follower. The voltage across resistor 206 will therefore be substantially equal to the voltage across capacitor 202. The portion of this voltage selected by the tap 407 on potentiometer 206 is applied to the second comparison circuit through LV contacts 408 and lead 207. The amount used determines the lower limit to which the permitted gap is reduced due to the time the first car has waited. The more voltage used, i.e., the closer tap 407 is to the cathode of triode 205, the lower will be the limit to which the permitted gap will ultimately be reduced.

The operation of the second comparator circuit is substantially the same as that of the first comparator circuit previously described.

The input 215 of the number of cars waiting circuit is applied to resistance 216, to series condenser 217 and thence to the cathode of diode 218 and the plate of diode 219. The cathode of diode 219 leads through NR relay lower contact 220 which is closed except when the light of the other phase is in the green period. When it is in such green period upper contact 409 of relay NR is closed to discharge condenser 221 to ground. The upper side of condenser 221 leads to the grid of tube 222 which is wired as a cathode follower. The output of this cathode follower circuit is fed to LV relay contact 224 to line 223 into the third comparator circuit. Relay contact 224 is closed during the green part of this phase. The input 215 receives voltage pulses from each of the lane timer units of the other phase of the circuit, each pulse representing the arrival of another vehicle at one of the detectors of the other phase. Each pulse results in charging and then discharging condenser 217. The negative charges leak through diode 218 to ground. The positive ones feed through diode 219 to build up a charge on condenser 221. Condenser 217 is smaller than condenser 221 and thus has a higher voltage drop for a given pulse. As the pulses come in through input 215, they build up a charge on condenser 221 and thus increase the potential on the cathode follower output 223 until the bias on tube 197 of the third comparator circuit conducts and energizes the relay 195.

As previously mentioned, the individual lane unit timers are so adjusted that they are controlled by the average volume density, the time waiting of cars in the other phase, and the number of cars waiting in the other phase. When any one of those has reached a level relative to the actual vehicle gap sufficient to fire its respective relay tube (in either the first, second or third comparator circuit), the entire lane unit timer circuit will indicate to the sequence device comparison unit that it no longer needs a further period of green. The portion of the lane unit circuit shown in FIG. 5 then remains in this condition until relay contact LV 179 is opened by the stepping switch at the end of the green period for this phase.

Figures 6, 7:
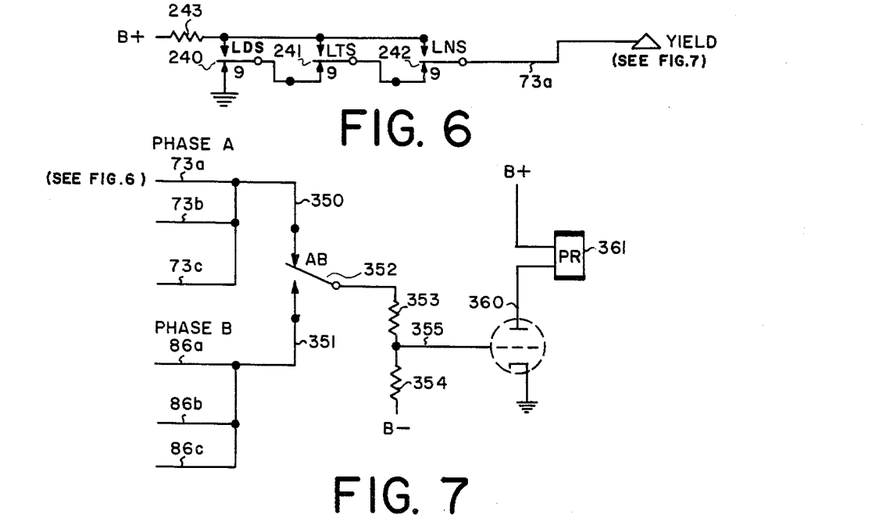
FIG. 6 is a schematic diagram of the output circuit of an individual lane timing unit.
FIG. 7 is a schematic diagram showing the interconnections of the control signal outputs of the several lane timing units in each phase to the right of way yield control circuit.

The method of indicating that no further green time is needed is shown in the circuit of FIG. 6. Here there are three additional contact arms of relays LDS 175, LTS 190 and LNS 195. These contact arms are, respectively, 240, 241 and 242. Normally, they are connected in series leading from ground to one of the leads into the sequence device comparison unit 70 (such as leads 73a, 73b, 73c, 86a, 86b and 86c of FIG. 3, here marked as 73a). The upper normally open contacts of each of relay contacts 240, 241 and 242 are connected to a source of positive potential through limiting resistance 243. As long as relays 175, 190 and 195 are deenergized, the output line is grounded. Once any one of the relays in either the first, second or third comparator circuit is energized, the output line 73a is then connected to the source of positive potential.

The interconnection of the output leads from each of the lane timer units and method by which they indicate that they no longer need a green period is shown in FIG. 7. Assuming that there are three lanes being detected in each phase, three output leads are shown. Thus, the output from phase A is shown on leads 73a, 73b and 73c, and from phase B on leads 86a, 86b and 86c. All of the output leads from the lane detector units from each phase are interconnected in line 350 for phase A and line 351 for phase B. There is a relay AB, the contact 352 of which is connected with lead 350 when phase A has the green light during either the initial portion or extendible portion. It breaks contact at the end of the phase A part of the signal cycle. Relay arm 352 leads through a voltage divider circuit of resistances 353 and 354 to a source of negative potential. The midpoint of this voltage divider circuit is led through conductor 355 to the grid of tube 360. The plate circuit of this tube includes the coil 361 of the passage reset relay PR referred to above. The cathode is grounded.

At the beginning of the green portion of the cycle of, for example, phase A, each of leads 73a, 73b and 73c lead to ground, as above described, and relay contact arm 352 connects with lead 350. This biases the grid of tube 360 to cut off due to the source of negative potential being connected to resistance 354 and to the grid. When one of the three lane units having output leads 73a, 73b and 73c indicates that no further green time is necessary, its respective lead ceases to be grounded and has a positive potential applied to it as above described. Due to the existence of limiting resistance 243 in the lane unit circuit there is a voltage drop between the source of positive potential and the ground of the remaining two of the output leads 73a, 73b and 73c. When, however, all three of these leads have ceased to be grounded and have positive potential applied, then this positive potential passes through the voltage divider circuit formed by limiting resistance 243 and resistances 353 and 354. This biases tube 360 so that it conducts and energizes relay coil 361, thus activating the passage time circuit described below.

When the light in phase A turns red, relay contact 352 connects with lead 351 for phase B and the same process is repeated.

Figure 8:
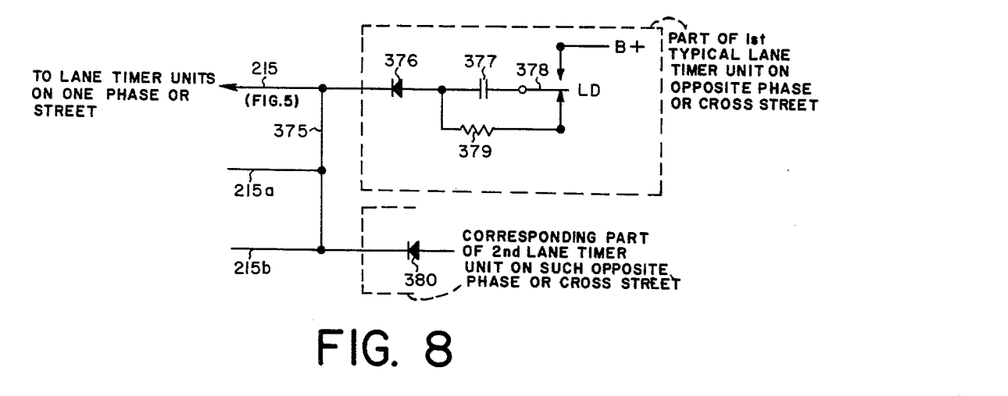
FIG. 8 is a schematic diagram showing the circuit by which information as to waiting cars is given to lane timing units.

FIG. 8 shows the input circuit connecting with lead 215 of FIG. 5, i.e., the input to the cars waiting circuit. As mentioned above, the length of the extension of the extendable period for the green cycle is dependent upon the number of cars waiting on the red light in the cross street or opposite traffic phase.

In FIG. 8, input 215 is shown. Also shown are inputs from how ever many other lane timer units there are for the green phase. These are marked 215a and 215b. All three inputs are interconnected through line 375.

Each of the lane units of the phase in the red part of the cycle includes circuits such as are outlined in the dotted rectangle of FIG. 8. These include a diode 376 connected in series with condenser 377 and the relay contact arm 378. This contact arm is part of the lane detector relay and is normally in the down position as shown in the drawing. Connected to the common terminal of diode 376 and condenser 377 is resistor 379 which makes contact with arm 378 in its normal position. The opposing energized position of relay arm 378 makes contact with a source of positive potential.

When a car actuates the lane detector relay LD, a pulse of positive potential passes through condenser 377 blocking isolation diode 376 and line 375 to each of the input lines 215, 215a and 215b of the number of cars waiting circuit.

All of the lane detector circuits of the red cycle feed into line 375 in the same manner. These are merely indicated by isolation diode 380.

Figure 9:
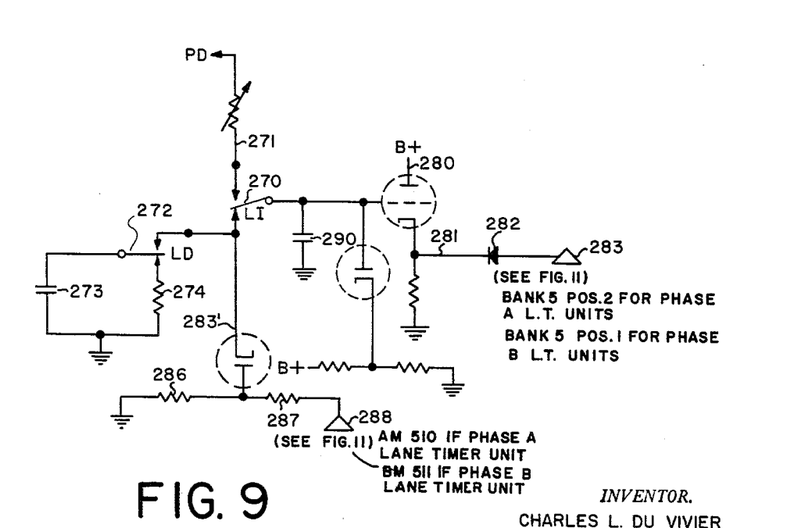
FIG. 9 is a schematic diagram showing the circuit for controlling the initial portion of the green time in accordance with the number of traffic actuations.

FIG. 9 shows the circuit diagram for extending the initial time portion of the green period. The extension is done through the added initial circuit shown. Except during the initial portion of the green period, relay LI contact arm 270 is in the lower position.

Figure 11:
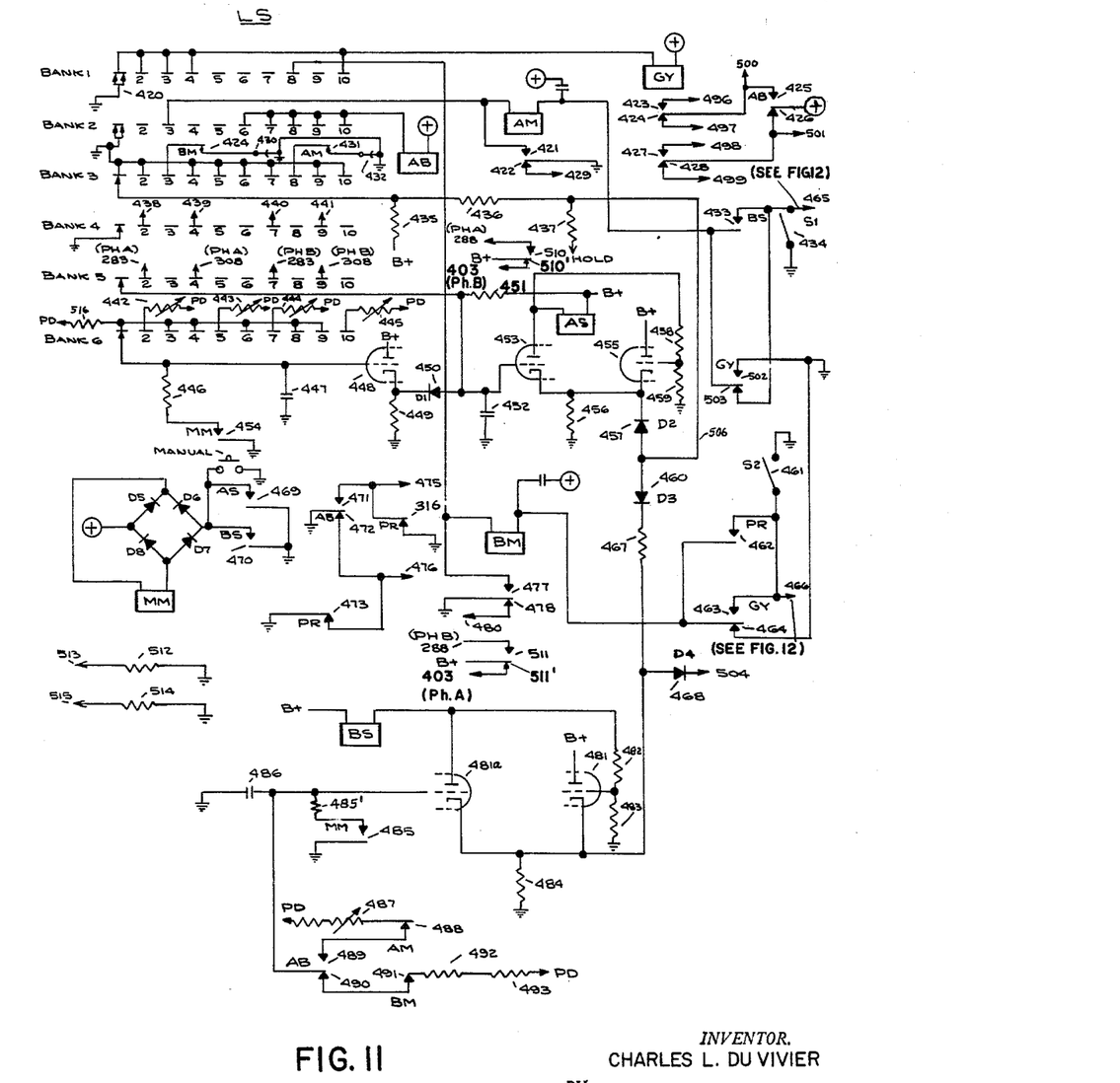
FIG. 11 is a schematic diagram showing the circuit of the sequence device comparison unit 70.

After the green had been accorded the phase with which the lane timer unit in question is associated, the associated memory relay will be energized. Let it now be assumed that the green light to this phase has been terminated. The phase memory relay (AM in the case of lane timer units associated with phase A, BM for those on phase B) applies B+ via contacts 510 on relay AM as shown in FIG. 11 for phase A or contacts 511 on relay BM for phase B to point 288 of the lane timer units. Resistors 287 and 286 form a potential divider between point 288 and ground, supplying a potential to the plate of diode 283′ if capacitor 290 is at a potential below that of the tap between resistors 286 and 287, capacitor 290 will be charged up to this potential. When a vehicle approaches the intersection in the lane associated with the lane timer unit under discussion, relay LD in the lane timer unit will operate, and the associated phase memory relay will be dropped out, removing the B+ from point 288. Further actuation of the detector relay LD will cause the moving arm of contact 272 to alternately make to the upper contact in FIG. 9, at which time a part of the charge on capacitor 290 is transferred via contact 270 to capacitor 273, and then the lower contact during which time the charge previously transferred from capacitor 290 to capacitor 273 is discharged through resistor 274. It will thus be seen that the charge in capacitor 290 is thus bucketed off. The amount of this charge taken out of capacitor 290, and hence the potential remaining in capacitor 290, is a function of the number of vehicle actuations.

When the sequence device comparison unit progresses through the various intervals in its cycle and comes to the minimum initial portion of the green of the phase with which the lane unit in question is associated, relay LI in said lane unit is energized and moving contact 270 opens the circuit to the LD relay contact 272 and closes a circuit to the charging resistor 271. Potential from a suitable point, here marked PD, is applied to charge capacitor 290 via resistor 271. This forms an RC timing circuit to time the minimum green requirement of this lane. The potential on capacitor 290 is applied to the grid of triode 280, connected as a cathode follower. The voltage of the cathode of this tube, which is substantially that of capacitor 290, is used to control the operation of the sequence device comparator unit through line 281, diode 282, and point 283.

Figure 10:
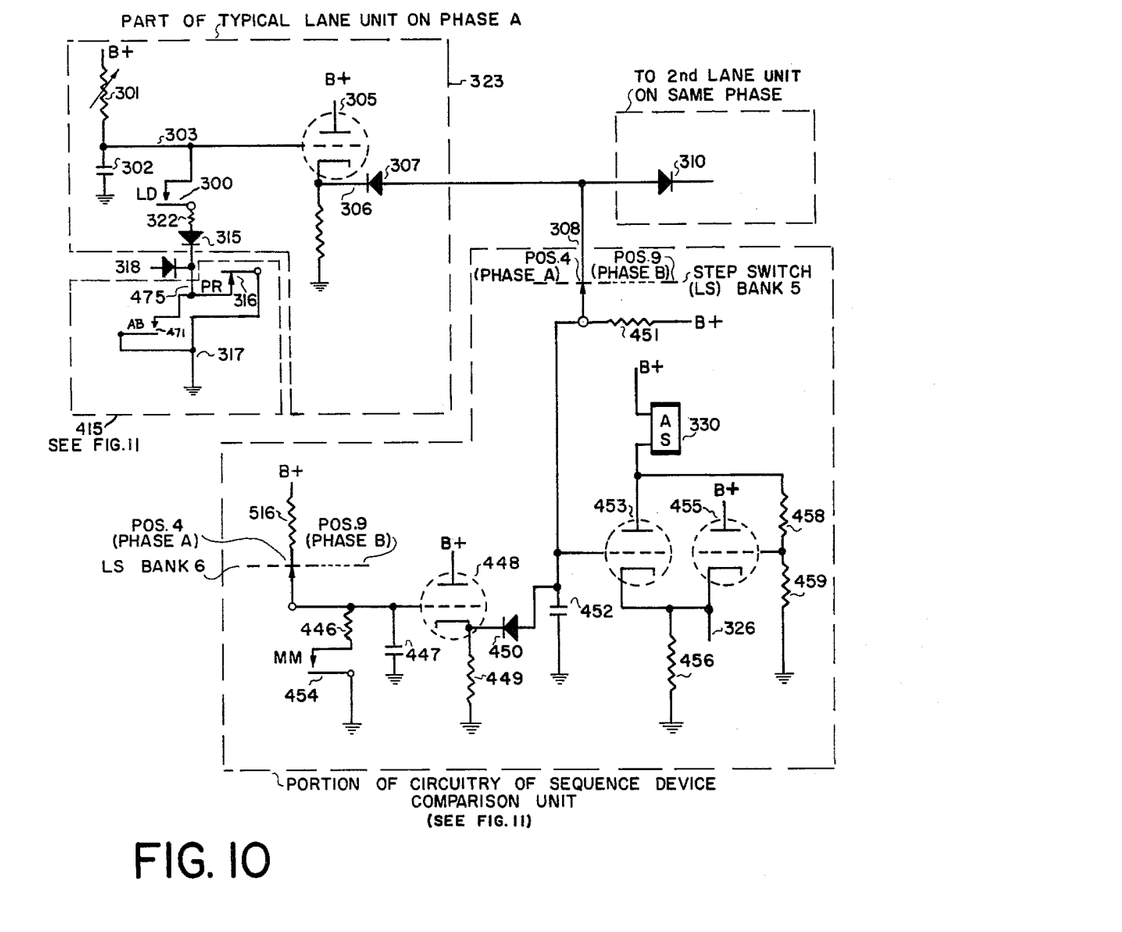
FIG. 10 is a schematic diagram of the passage time circuit of a representative lane and the associated circuitry of the sequence device comparison unit 70. This diagram includes a repetition of part of the sequence device comparison unit as so designated, for convenience of reference.

FIG. 10 shows details of the passage time circuit and its interconnection with the lane detector circuit. Each lane detector has a normally-open contact 300 actuated by the pulse from a passing vehicle. This contact is shown as a portion of the total circuit of FIG. 10 in a separate box marked portion of typical lane detector or timer unit circuit. In the lane detector circuit shown there is a variable lane passage resistance 301 connected in series with condenser 302 between a source of positive potential and ground. Lead 303 connects the center tap between the resistor and condenser with the contact of lane detector LD relay contact 300 and the grid of tube 305 which is wired as a cathode follower. The output of the cathode follower circuit is on lead 306 through diode 307 to line 308. Line 308 is common to the output of each of the individual lane detector circuits. Diode 310 is connected to line 308 and indicates another similar lane detector circuit, such as just described above. There may be as many of these as there are lanes. The lower contact of lane detector relay contact switch 300 passes through diode 315 to normally closed passage reset contact 316 of relay PR and then to ground through lead 317. Lead 318 is representative of other leads from similar lane detector circuits which also go to the same passage release relay contact 316.

Output line 308 leads to large (one megohm) resistor 451 and thence to a source of positive potential. Line 308 also passes to timing condenser 452 and leads into the grid of tube 453. The plate circuit of tube 453 passes through relay AS coil 330 to a source of positive potential. It is connected through series resistors 458 and 459 leading to ground. The center tap of resistors 458 and 459 leads to the grid of tube 455. The cathodes of tubes 453 and 455 are connected together and through resistance 456 to ground. The lead 326 extends to a diode 457 not shown here but shown in FIG. 11.

During the period that the lane detector circuits shown in FIG. 10 are connected to the moving vehicle phase, i.e., the green light, PR relay contact 316 is closed. Condenser 302 is charged through timing resistor 301 from a source of positive potential to time the passage time from each vehicle actuation. It is substantially discharged every time the lane detector contact 300 is closed by the passing of a vehicle.

Line 308 is connected to the cathode of tube 305 via diode 307. Therefore the potential on line 308, due to charging of capacitor 452 thru resistor 451, cannot rise above that of the cathode of tube 305. Each time LD relay contacts 300 discharge capacitor 302, the cathode of tube 305 goes substantially to ground, discharging capacitor 452 via line 308 and diode 307.

At the time that all of the individual lane detectors have signaled that they are ready for the end of their green cycle (as described above with reference to FIG. ), relay contact 316 is opened. This disconnects the lane detector switch 300, preventing further discharge of capacitor 302. Therefore capacitor 302 will continue to charge.

Tube 455 will be initially conducting and since it is wired in a flip-flop circuit relation to tube 453, as tube 453 tends to conduct more with charging of condenser 452, tube 455 conducts less, until finally, 453 suddenly becomes sufficiently conducting to operate relay AS 330. This relay AS operates the stepping magnet MM of the stepping switch via the closure of contact 469 (see FIG. 1). In addition to operating the stepping magnet switch, stepping magnet MM relay AS also closes contact 454 to discharge capacitor 447 which substantially grounds the grid of tube 448. This makes it again non-conducting and so tube 455 once again does conduct and the cycle can repeat.

The stepping switch used, sometimes known as a telephone line switch, is of the conventional type used in circuits of this nature. It serves to control periods of the cycle and to reset various timing circuits.

The part of the typical lane unit illustrated in box 323 in FIG. 10 may internally represent also any lane on phase B, except that the external connections to the companion unit 70 in FIG. 11 extend to line 476 and PR relay contact 473 and AB relay contact 472 in FIG. 11.

In operation the circuit has two phases, the A phase and the B phase representing two intersecting lines of traffic. If we assume that the A phase has just turned green, the traffic can then move through the A phase direction and through the green light. This moving traffic has a minimum period through which it may travel regardless of further actuations of the lane detector and regardless of whether or not cars appear in the B phase lanes. This period is called the initial minimum, and determined by the adjustable time setting of an RC timing circuit and further as increased by the number of vehicle actuations on the A phase during the preceding red period for A phase.

Each of the individual lane timer units connected with each of the individual detectors in the A phase will then commence measuring the gaps between further automobiles traveling in the A phase against the "criteria" set by the time waiting circuit and the number of cars waiting circuit. These circuits as mentioned above have obtained their information as to maximum waiting time of one car and total cars waiting in the B phase from the detectors in the B phase lanes. Thereafter, each of phase A timer lane units will signal to the sequence device comparison unit that it needs additional green time and that the initial minimum period will be extended. In due course, after a vehicle has appeared in phase B, the actual gaps will be insufficient to overcome the demands from phase B and the curve of actual gaps will cross one or more of the curves of the other signals and thereafter that particular lane timer unit through the actuation of one of the relays in the three comparator circuits will signal that it needs no more green time. Having so signaled, the circuit becomes locked in an inactive position until the next cycle. One at a time each of the lane timer units for each lane in phase A will signal that it no longer needs additional green time. When all have so signaled, then the passage time circuit will come into play and will determine the additional time that is to elapse prior to the end of the green cycle for phase A.

FIG. 11 illustrates schematically the circuit diagram of the sequence device comparison unit 70. This includes the step by step switch LS which provides the proper sequence of operation of the several lane timer units, the initial and minimum interval timing, clearance interval timing and maximum extension limit timer, and related functions in the proper parts of the traffic signal cycle, the stepping of the switch LS in turn being controlled by the several timing devices and circuits. The switch LS controls the traffic signals through the contacts of the relays AB and GY.

The traffic signals consist of a green, a yellow, and a red lens facing each approach, as shown at the center of the intersection and labeled 1 in FIG. 1. The green signal of phase A is connected to line 498. The yellow signal of phase A is connected to line 499. The red signal of phase A is connected to line 500. The green signal of phase B is connected to line 497. The yellow signal of phase B is connected to line 496. The red signal of phase B is connected to line 501.

In general the stepping switch has six banks, with individual contact wipers, successively making contact with the stationary contacts numbered 1 through 10 of the several banks, the wipers stepping in unison when the stepping magnet MM is operated and released by application of ground to the adjacent rectifier bridge by one of the contacts 469 of relay AS, 470 of relay BS or the pushbutton "manual."

On stepping switch LS banks 5 and 6, relay AS, tubes 448, 453 and 455, and associated components form a timing circuit which is used to time the minimum initial portion of the green for each phase, the yellow clearance interval for each phase, and to act as a comparison unit as well during the said minimum green.

Stepping switch position 1 is a skip step. Position 2 is the minimum green position for phase A. Position 3 is a skip and rest position. Position 4 is the extendible green position of phase A. Position 5 is the clearance interval for phase A. Positions 6 through 10 are used for the corresponding positions of phase B with 6 corresponding to 1 etc. Bank 5 of the stepping switch selects the external circuits to be used for comparison purposes. Bank 6 selects the proper timing resistor to charge capacitor 447 in each interval. Relay AS, tube 453, and tube 455 form a timing circuit. In the rest condition, relay AS is deenergized, tube 453 is nonconducting and tube 455 is conducting. The grid of tube 455, a cathode follower, is fixed at the potential set by the junction of resistors 458 and 459, part of a potential divider including the said two resistors and the coil of relay AS. This establishes the voltage at the cathode of tube 453. As the voltage on capacitor 452 rises and approaches that at the cathode of tube 453, tube 453 begins to conduct. As it does so, the voltage at the plate drops, due to the increased current through the coil of relay AS. This drop causes the grid of tube 455 to drop because the voltage across resistors 456 and 459 is reduced. This lowers the cathode voltage of tube 455 and tube 453, further increasing conduction of the latter. With suitable values of resistance, this effect is cumulative, resulting in sharply energizing relay AS. The circuit is restored to rest condition by lowering the voltage of the grid of tube 453 sufficiently to cut this tube off.

Let us assume the stepping switch is in position 1. A circuit is completed from a source of potential PD through resistor 516 to bank 6 position 1 to charge capacitor 447. The potential of this capacitor is applied to the grid of tube 448, a cathode follower. The voltage across resistor 449 is therefore substantially equal to that across capacitor 447. A circuit is completed from B+ through resistor 451 and diode 450 to the cathode of tube 448. A circuit is completed to charge capacitor 452 from B+ via resistor 451, but this capacitor cannot charge any faster than the voltage at the cathode of tube 448 rises, due to diode 450. The voltage on capacitor 452, and hence the input to timing tube 453, therefore follows the charging voltage of capacitor 447.

When capacitor 447 is sufficiently charged, relay AS operates, advancing the stepping switch to position 2 as previously described.

In position 2 bank 6 of the stepping switch connects resistor 442, the phase A minimum green resistor, into the charging circuit of capacitor 447. Bank 5 connects capacitor 452 to the comparator circuit line 283 (phase A) which leads to line 283 of all of the lane timer units associated with phase A, this portion of the circuit of a typical unit being as shown in FIG. 9. It will be noted that resistor 451 may now charge capacitor 452 to a voltage no higher than the voltage across resistor 449 in FIG. 11 or that across the resistor in the cathode of tube 280 as shown in FIG. 9, which circuit is duplicated in each lane unit. Diodes 450 in FIG. 11 and 282 in each lane unit serve to isolate the various circuits so that only the lowest voltage (and hence the circuit requiring the longest time to reach the conduction voltage of the tube 453) controls.

When the required green, the minimum or that of each lane timer unit, whichever is longest, has been timed, the stepping relay advances to position 3. The stepping relay will rest in this position only if there are no calls on phase B. If there is a demand for the right of way on phase B, the stepping relay will time a skip step and go on into position 4. In position 4 of bank 6 the skipping resistor 516 is charging capacitor 447 while capacitor 452 is connected to line 308 via position 4, bank 5 (phase A) which position is connected to line 308 in FIG. 10, which shows the entire circuit in convenient form.

In a manner similar to that described in connection with operation in position 2, the passage interval of that unit of the several lane timer units associated with phase A which has the largest amount of time yet to be timed controls the voltage on capacitor 452. Termination of the extendible portion of the green of phase A occurs as a result of expiration of the passage time on all lanes when the voltage on capacitor 452 reaches the point at which tube 453 conducts, causing AS relay to be energized to advance the stepping relay into position 5.

In position 5, the phase A clearance interval, the resistor 443 is connected to charge capacitor 447 through bank 6 position 5 while no connection is made to bank 5 position 5. The clearance is thus timed, and the stepping relay advances to position 6.

Stepping relay positions 6 through 10 are used for functions related to phase B and correspond to positions 1 through 5 respectively of phase A.

It should be noted that each time the stepping relay is energized, motor magnet contacts 454 are closed to discharge capacitor 447 through current limiting resistor 446 while contacts 485 close to discharge capacitor 486 through current limiting resistor 485.

The stepping switch LS can rest in position 3 in phase A green, or in position 8 in phase B green. The switch LS remains in the phase A green rest position for example until the memory relay BM of B phase is released by actuation of any one of the phase B detectors, upon which the switch LS is advanced to position 4 as more fully described below.

The memory relay BM had previously been operated in the phase B green position 8 and locked in over its own contact 477, on alternating currents via a capacitor. Thereafter upon closure of contact 520 of LD relay in any lane timer unit on B phase by operation of such relay LD by closure of the traffic detector switch by traffic actuation of the detector in the associated lane, the relay BM is grounded and released to "remember" the call on phase B. The latter action of contact 520 is effective from the point at which relay PR operates in position 9.

Thus with release of relay BM while in stepping switch position 3, contact 424 of relay BM closes to place ground effectively through resistor 436 to remove blocking bias from tubes 453 and 455.

Similarly stepping switch LS will rest in position 8 phase B green until memory relay AM is released by traffic actuation of any lane unit on phase A to close AM contact 431.

Figure 12:
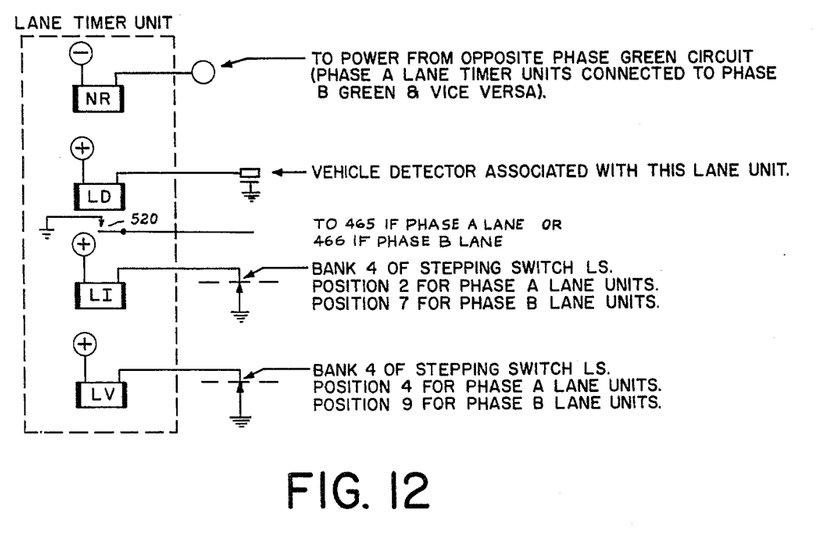
FIG. 12 is a schematic diagram showing several relays of the lane unit having contacts identified by similar letter designations in other figures herein.

FIG. 12 illustrates the several relay coils NR, LD, LI and LV which also form part of a typical lane timer unit, and also their external operating connections. Also contact 520 of relay LD is illustrated in FIG. 12, and its connections indicated. Relay LD is operated each time that the associated vehicle detector switch is closed by vehicle actuation in the particular lane, and thus contact 520 is also closed upon each such actuation.

It will be appreciated that although preferably all of the lanes having vehicle detectors have individual lane timer units for best efficiency, it may be that some lanes at an intersection may be of less importance and may have their individual detectors, if on the same phase, connected to a single lane timer unit common to these lesser lanes, while other more important remaining multiple lanes on one or more phases may have individual lane units.

It will be understood that although the present disclosure represents a preferred embodiment of the invention this and other rearrangements of parts or changes in the details of the parts may be made without departing from the spirit of the invention as defined by the claims.

I claim:

1. In a traffic control system having vehicle detectors individual to each of a plurality of lanes in each of two traffic phases and having for each one phase a common accord of right-of-way to the plural lanes of said one phase, each said detector providing electrical impulses in response to vehicle actuation in its associated lane, the combination comprising an individual lane timer means individual to and associated with each of said detectors to receive electrical impulses therefrom, means in each said lane timer means of one traffic phase for producing a vehicle gap signal, said signal representing the time gap from the last prior vehicle actuation of its associated detector and being quantitatively related to the density of vehicle traffic over its respective detector, means in the other said phase for providing a time waiting control signal, means in the lane timer means of said one phase for providing an electrical signal progressively varying with time in response to said time waiting control signal, said electrical signal representing waiting time on said other phase, means in the lane timer means of said one phase for providing a further electrical signal varying progressively in response to the impulses from the detecors of said other phase, said further electrical signal representing the number of cars waiting on said other phase, each said lane timer means including a waiting time comparator means for comparing said vehicle gap signal of said one phase with said waiting time signal in accordance with a first predetermined standard, and each said lane timer means including a number of vehicles waiting comparator circuit means for comparing said vehicle gap signal with the signal indication of said number of vehicles waiting signal in accordance with a second predetermined standard, and switch means actuated to provide a preset output yield signal if either of said pairs of compared signals exceeds its respective standard.

2. A traffic control system as in claim 1, in which said lane timer means include timing circuits operating periodically to reset said means for producing said density signal, said waiting time signal and said vehicles waiting signal by predetermined amounts.

3. A traffic control system as in claim 1 having control means to receive and compare said output signals from a plurality of lane timer means to provide a traffic control signal when all of said output signals at least accord with predetermined relationship.

4. A traffic control system as in claim 1, in which said individual lane timer means include means for producing a second output signal subsequent to the first mentioned output signal and at a time related to the number of vehicles passing said respective detector during a selected time period related to the time of production of said preset output signal.

5. A traffic control system having a traffic detector and associated lane-timer means in each of a plurality of lanes in each of two traffic phases of a traffic signal cycle, each said lane-timer means including means to produce a first electrical voltage signal in response to the actuations of said detector in its associated lane, said electrical signal representing the flow of traffic actuating said detector in its associated lane, said lane-timer means on each of said phases including means to produce a second electrical voltage signal in response to the actuations of the detector associated with the lane timing means in the other of said phases and comparator means to compare the first electrical voltage signal with the second electrical voltage signal in each lane individually on one traffic phase with the second electrical voltage signal of the other traffic phase to produce an output signal at a time which is a function of the relative values of the electrical voltage signals representing traffic flow in the lanes of the respective lane-timer means compared, and control means to receive said output signals from each of said lane-timer means in one phase and to produce a traffic control signal when all of said output signals accord with a predetermined relationship.

6. A traffic control system for the intersection of two roads, one of which has more than one lane, including "stop" and "go" traffic signals to be displayed to the traffic thereon, vehicle actuated means individual to each of two lanes of said one road and to one lane of the other road, traffic signal control means for operating said signals for according right-of-way alternately to the two roads including means to accord right-of-way in common to the plural lanes in the one road and means for concurrently interrupting the right-of-way in the other road in one phase of the signal cycle and including means to accord right-of-way to the other road and means for concurrently interrupting right-of-way to the plural lanes of said one road in another part of the signal cycle and said traffic signal control means including means for timing the display period of a "go" signal to one road and "stop" signal to the other road between minimum and maximum time limits for such accord of right-of-way to said one road, said timing means including lane-timer means individual to each of said two lanes in said one road and said one lane in said other road and each coupled to the vehicle actuated means of the lane associated with said lane-timer for controlling the "go" signal display period in response to actuation of the vehicle actuated means, each lane-timer including means operating in the "go" signal display period for its associated lane for timing a short time increment to serve as a potential time gap limit for the time spacing between actuations of the vehicle actuated means of the same lane with which the lane-timer is associated and to provide a control signal output when said timing means has completed timing said time increment, means individual to each lane-timer means for resetting the timing means of the individual lane-timer means in response to actuation of the vehicle actuated means of the same lane with which the lane-timer means is associated to restart the timing of said time increment after each said actuation before said completion of timing as a potential measure of the actual time gap between vehicle actuations in said associated lane, means for coupling the traffic signal control means to the lane-timer means of the lanes having the "go" signal displayed therein concurrently to be controlled by said control signal outputs from the plural lane-timer means of the lanes having the "go" signal concurrently displayed therein to extend within said maximum time limit the time of said concurrent display of the "go" signal to the lanes of said one road until all of said plural lane-timer means for the latter lanes have completed timing their respective time increments to provide said control signal outputs, means for terminating said concurrent display of the "go" signal in response to concurrent said control signal outputs from all of said last mentioned plural lane-timer means, and means coupling the plural lane-timer means of the lanes having concurrent display of the "go" signal to the lane-timer means of the road concurrently having display of the "stop" signal for reducing progressively the said time increments of the respective last named plural lane-timer means in response to actuation of the vehicle actuated means associated with said lane-timer means of the lane having display of the "stop" signal, said increment reducing means including means in the respective lane-timer means for adjusting individually the said reduction of said increment in response to actuation.

7. A system as in claim 6 and in which said reduction adjusting means includes means individual to each said lane timer means for setting a low limit to which said increment can be so reduced and a rate of said reduction toward said low limit in response to actuation of the vehicle actuated means associated with the lane timer means of the lane having the "stop" signal displayed.

8. A system as in claim 6 and in which said increment reducing means includes means individual to each said lane timer means for reducing said increment in accordance with elapsed time after said actuation of the vehicle actuated means associated with lane timer means of a lane concurrently having the "stop" signal displayed.

9. A system as in claim 6 and in which said increment reducing means includes means individual to each lane timer means for reducing said increment in accordance with the number of actuations of said vehicle actuated means associated with the lane timer means of the lane having the "stop" signal displayed.

10. A system as in claim 6 and in which said increment timing means includes a resistance-capacitance timing circuit providing a voltage varying slowly progressively in one direction for timing said increment and varied quickly in the opposite direction by said resetting means to reset the timing, and said increment reducing means includes a further resistance-capacitance circuit and means for varying the charge on the capacitance of the last named circuit in the lane timer means on one road having the "go" signal displayed in response to actuation of the vehicle actuated means associated with the lane timer means of the other road having a "stop" signal to provide a voltage varying progressively with said charge, and said increment timing means includes means for comparing said two voltages including a voltage responsive device for responding to a predetermined relation between said two voltages to complete said timing of said time increment to provide said output signal.

References Cited by the Examiner

UNITED STATES PATENTS

| | | | |
|---|---|---|---|
| 2,183,780 | 12/1939 | Wilcox | 340—36 |
| 2,265,991 | 12/1941 | Barker | 340—36 |
| 2,750,576 | 6/1956 | Beaubien | 340—35 |
| 2,883,644 | 4/1959 | Barker | 340—36 |
| 3,047,838 | 7/1962 | Hendricks | 340—35 |

OTHER REFERENCES

A publication entitled Bulletin C-134 covering Model 1022N, two-phase volume-density controller, copyright 1957, by Eastern Industries, Inc.

NEIL C. READ, *Primary Examiner.*

THOMAS B. HABECKER, *Examiner.*